United States Patent Office 2,874,391
Patented Feb. 24, 1959

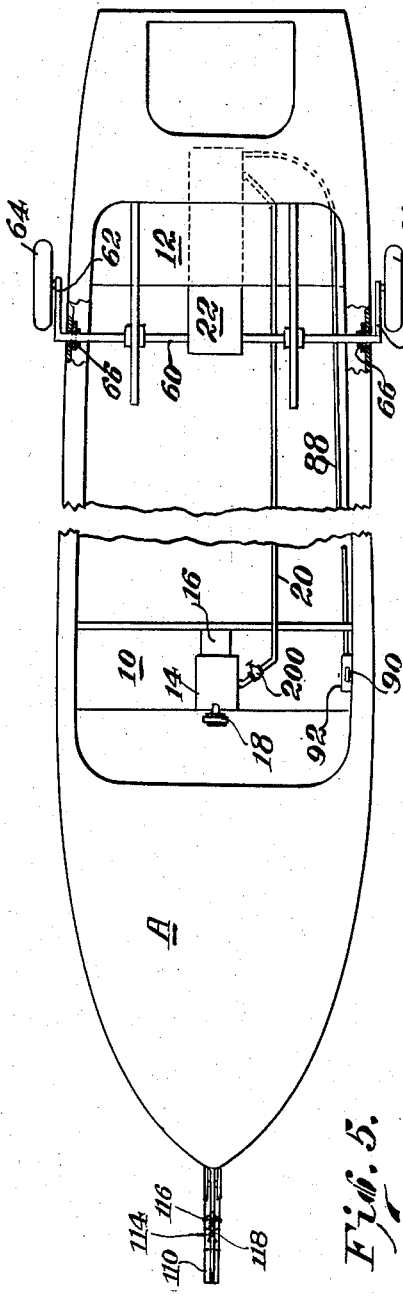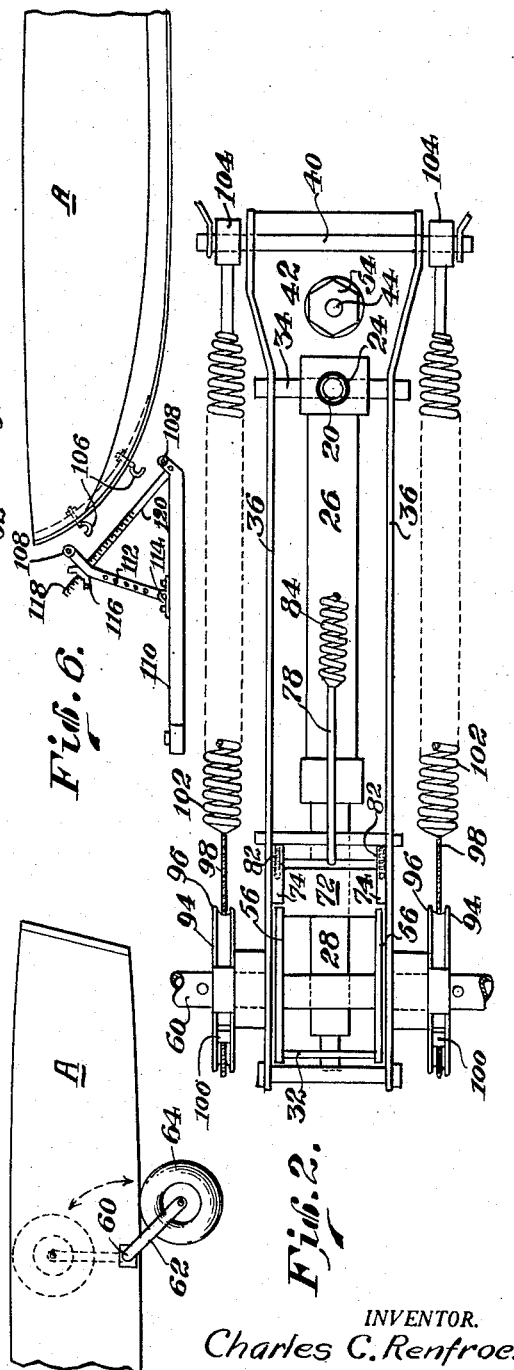

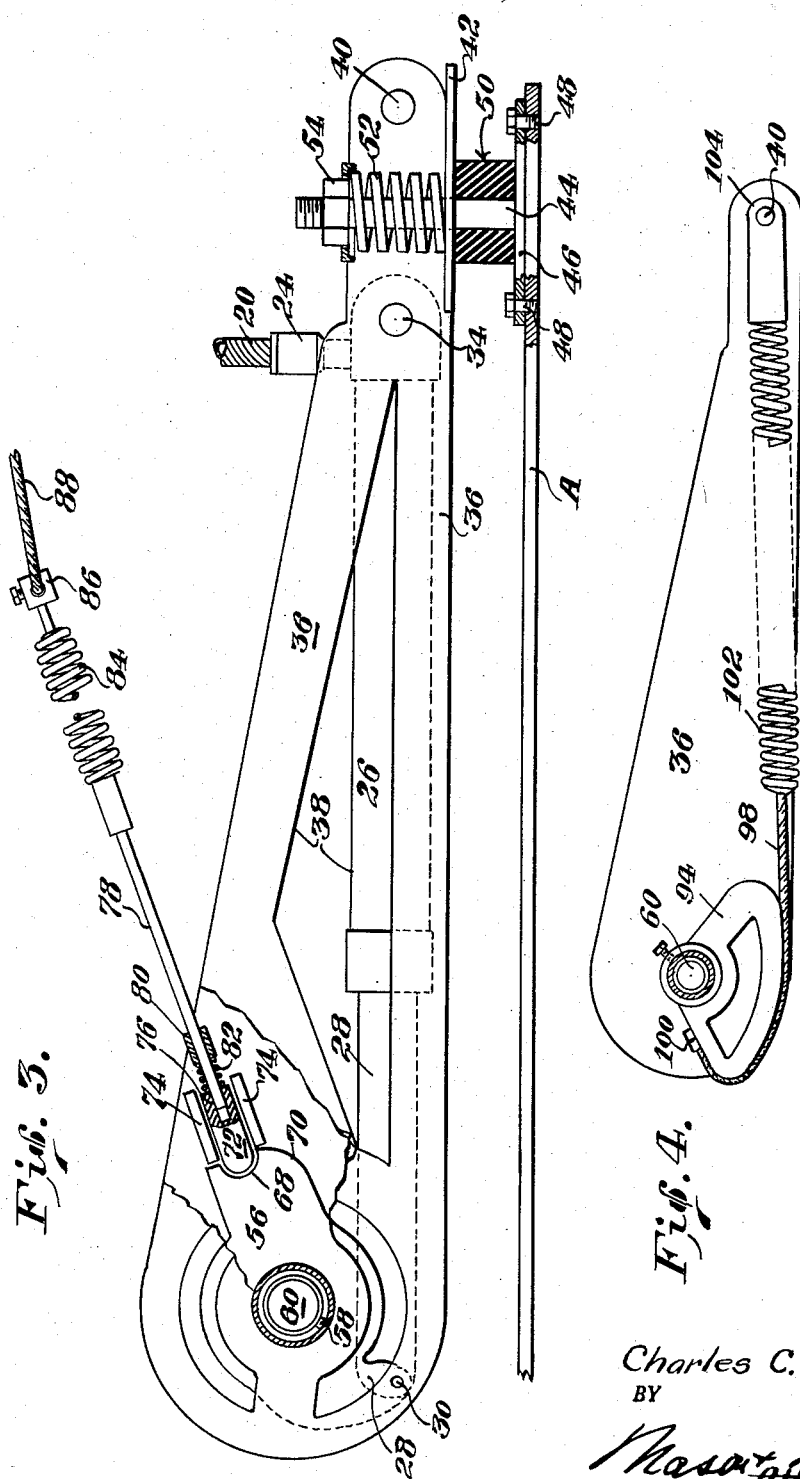

2,874,391

HYDRAULICALLY OPERATED RETRACTIBLE RUNNING GEAR FOR BOATS

Charles C. Renfroe, Decatur, Ga., assignor of one-half to Lonzy M. Martin, Decatur, Ga.

Application February 3, 1956, Serial No. 563,258

6 Claims. (Cl. 9—1)

The present invention is directed to a hydraulically operated retractible running gear for boats whereby the boats may be towed from place to place by an automotive vehicle. When the boat reaches the place where it is to be launched the hydraulic mechanism is operated to cause the wheels to be retracted, whereupon the boat may be launched.

An object of the invention is to provide an improved hydraulic mechanism for operating the running gear on a boat.

A further object is to provide hydraulic mechanism for moving the running gear to one position, and mechanical means for returning the mechanism to its original position.

An additional object is to provide a manually controlled mechanism which may be easily attached to existing boats, such mechanism being relatively inexpensive.

Other objects will be found hereinafter throughout the specification.

In the drawings:

Figure 1 is a top plan view partially broken away generally showing the placement of the parts;

Figure 2 is an enlarged top plan view of the wheel lifting and lowering mechanism, parts of the same being broken away;

Figure 3 is an enlarged side elevation of the structure shown in Figure 2, the same being partially in section and partly broken away;

Figure 4 is an enlarged side elevation of the quadrant and spring mechanism, the same being shown in section and partly broken away;

Figure 5 is a side elevation of the rear of the boat with one of the wheels shown in boat trailing position, said wheel being shown in dotted lines in its elevated or boat launching position; and Figure 6 is a side elevational view of a collapsible hitch for connecting a boat to a vehicle.

Referring to the drawings A indicates the boat to which the present retractible running gear is applied. The boat is provided with a front seat 10 and a rear seat 12.

As shown in Figure 1 a hand operated pump 14 is supplied by a fluid from a reservoir 16, the pump being operated by a handle 18, each of these parts being diagramamtically illustrated. It will be understood that a foot pump may be substituted for the hand pump, and that either of these may be dispensed with and an electric motor may be substituted therefor for operating either a gear type pump or a reciprocating piston type pump, which motor may be driven by a suitable source of electrical potential. Conversely, power take-off may be used where an inboard engine is used in the boat. The source of power is not an essential feature of the invention and therefore has not been illustrated except as diagramatically shown in Figure 1.

Fluid from the hydraulic pump 14 is delivered under pressure through steel tubing 20 to the power unit indicated generally at 22 in Figure 1. This unit is provided with a cover as seen in Figure 1, the parts enclosed by said cover being illustrated in detail in Figures 2, 3 and 4. The tubing 20 is connected to a fitting 24 of a fluid cylinder 26 which is provided with a piston 28. The piston is pivotally connected at 30 with the cross pin 32.

The right end of cylinder 26, as shown in Figures 2 and 3, is mounted on a trunnion 34 that permits pivotal movement of the piston and a cylinder in the framework which comprises frame pieces 36, each having a cut-out portion 38, as shown in Figure 3. The plates 36, at their right ends as viewed in Figures 2 and 3, are connected to each other by the pin 40. The lower right ends of the frame pieces are rigidly connected to a saddle plate 42. The latter is provided with a central aperture for the reception of the stay bolt 44 which latter is rigidly mounted by means of a plate 46 and fastening members 48 to the hull of the boat A.

Mounted on the bolt 44 is a rubber cushion block 50, the upper surface of which forms a support for the saddle plate 42, the bolt extending through an aperture in the block. A coil compression spring 52 also surrounds the bolt and the lower portion thereof engages the upper surface of the saddle plate 42. The amount of compression of the spring is determined by the adjustment of the nut 54 that threadingly engages the end of the bolt 44. It will be noted that the "snubber" function is performed by the structure shown in detail in Figure 3. The left end of the framework which includes the frame pieces 36 is rigidly fixed to the shaft 60 on which are mounted the cranks 62, and the free end of the frame pieces is supported on the rubber block 50 which cushions downward movement of the framework, as viewed in this figure, and there is a spring 52 which cushions any upward movement of the framework. Figure 3 shows the position of the parts when the wheels are in ground-engaging position. Should the wheels 44, shown in Figure 5, strike an obstruction, the crank 62 would tend to rotate in a counterclockwise direction, which would cause upward movement of the arms 62 about the pivot 60. Such upward movement would be cushioned or "snubbed" by the spring 52.

Cross pin 32 is rigidly connected to a pair of spaced cam locking plates 56, and each of these plates is keyed at 58 to the shaft 60. Shaft 60 is provided with a pair of cranks 62 at its extremities having bearings for the support of tired wheels 64. As seen in Figure 1 the shaft is provided with inner packing glands 66 to prevent the entrance of water through the sides of the boat.

It will be appreciated that the locking plates 56 rotate with the shaft 60. These plates may be coupled to the frame pieces 36 by the construction particularly shown in Figures 2 and 3. Each cam plate is provided with a notch or cut-out portion 68 and a cam portion 70. A plunger 72 is provided with a rounded head for engaging said notch 68. The plunger is guided at each side by a pair of guides 74 as best seen in Figure 3, each pair of guides being welded or otherwise rigidly mounted on the sides of the frame pieces 36. The plunger 72 is provided with a hollow aperture 76 for the reception of a rod 78. Spaced from the left end of this rod is a collar or stop member 80. An expansion spring 82 has one of its ends in abutting relation with the collar 80 and its other end presses the plunger 72 into the notch 68 and retains the plunger in said notch.

The plunger is connected by a second spring 84 at 86 to a cable 88, and the spring 84 is connected at its other end to the rod 78. This cable is led over suitable pulleys to the forward portion of the boat A where it is connected to a lever 90 pivotally mounted in a casing 92. The lever may be moved from one position to another to actuate the cable 88 to thereby remove the plunger 72 from the notch 68. However, when it is desired to move the plunger to the position shown in Figure 3 the position of the lever 90 is reversed so as to force the plunger to the left, as seen in Figure 3. The purpose of the spring 84 is to provide an elastic connection between the cable 88 and the rod 78, but this spring is not essential to the operation of the rod 78 and may be dispensed with.

As shown in Figures 2 and 4 a pair of quadrants 94 are splined to shaft 60, each quadrant is provided with a curved track portion 96 having a cable 98. Each cable has one of its ends connected to block 100 mounted on its quadrant, the opposite end of the cable being connected to the contraction springs 102 whose opposite ends are anchored at 104 by pin 40.

The operation of these parts will be explained hereinafter. The boat is provided with a pair of spaced socket members 106 which face in the opposite direction, as shown in Figure 6. These may be engaged by the ball or cylindrical shaped members 108.

The hitch is provided with a base member 110 having an upwardly extending arms 112 which is pivotally mounted at 114 to the base. This arm has its opposite end provided with one of the ball members 108, and the upper end with its ball member may be adjusted toward and from the other ball member. Adjustment is effected by wing nut that threadingly engages the threads 118 of rod 120, it being understood that the upwardly extending arm 112 has a cylindrical aperture in order that it may be moved up and down along the rod 120, when it is desired that each ball member engage its corresponding socket member so as to firmly hold the boat in position for towing purposes but permit the boat to swing on the ball and socket members in order to negotiate turns in a road while being towed.

Operation

The shaft 60 which mounts wheels 64 may be rotated in a clockwise direction by operating pump 14. The forcing of fluid into cylinder 26 will move the piston 28 to the left thereby causing clockwise rotation of the shaft 60 as viewed in Figures 3, 4 and 5. This rotation will cause the wheels 64 to assume the position shown in full lines in Figure 5. As the rotation continues, the cam portion 70 of each of the locking plates 56 moves the plunger 72 to the right as viewed in Figure 3, until the notch 56 comes opposite said plunger, whereupon the plunger is pressed to the left by spring 82 into notch 68.

With the parts in this position, and as shown in detail in Figure 3, the wheels are in ground engaging position and during the towing of the boat the frame pieces 36 and all parts mounted thereon, including the cylinder and piston, the quadrants and springs attached thereto, are cushioned by the rubber cushion blocks 50 and coil compression spring 52 when irregularities in the roadway will tend to cause the wheels to rotate on their cranks about the center of the shaft 60. As this shaft oscillates, its movements and the movements of all of the parts are cushioned by the rubber block and spring structure. A suitable turn-off valve, indicated diagrammatically at 200, is located in the line 20. Cushioning action may also be obtained by the torsional action of the cranks 62, if they are constructed of heat treated spring steel.

When it is desired to raise the wheels to the dotted line position shown in Figure 5, the cable 88 is actuated by lever 90 so as to pull the plunger 72 from its notch 68 thereby freeing the plates 56 so that they can rotate relatively to the frame.

Inasmuch as the clockwise rotation of the shaft 60 by the hydraulic mechanism has also caused rotation of the quadrants 94 and the placing of springs 102 under tension, as soon as the cam locking plates are free from the frame 36 the springs 102 acting through quadrants 94 cause counterclockwise rotation of shaft 60 and crank 62 mounted thereon to cause the wheels to be lifted to their dotted line position.

It will be understood that the wheels may be lifted on opposite sides of the boat as shown or wells, not shown, may be provided as disclosed for instance in the patent to Crook No. 2,518,602 of August 15, 1950.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A boat having a shaft extending transversely across the same, cranks adjacent the ends of said shaft and wheels on said cranks, hydraulic means for rotating said shaft in one direction comprising a hydraulic cylinder, a piston in said cylinder, eccentric means fixed to said shaft and means connecting said eccentric means to said piston, spring means for moving said shaft in the opposite direction, whereby movement of said piston by hydraulic actuation causes partial rotation of said eccentric means and said shaft, said spring means having means connecting the same with said shaft whereby said piston and shaft movement causes the storing of power in said spring means, locking means for locking said shaft and the wheels supported thereon in operative position, and manual means for releasing said locking means whereby to allow said spring means to partially rotate said shaft in the opposite direction and return said wheels to their inoperative position, a supporting means for mounting said hydraulic means and said spring means, and snubber means connected to said supporting means for dampening vibratory movements of said wheels and said shaft.

2. A boat having a shaft extending transversely across the same, cranks adjacent the ends of said shaft and wheels on said cranks, hydraulic means for rotating said shaft in one direction comprising a hydraulic cylinder, a piston in said cylinder, eccentric means fixed to said shaft and means connecting said eccentric means to said piston, spring means for moving said shaft in the opposite direction, whereby movement of said piston by hydraulic actuation causes partial rotation of said eccentric means and said shaft, said spring means having means connecting the same with said shaft whereby said piston and shaft movement causes the storing of power in said spring means, locking means for locking said shaft and the wheels supported thereon in operative position, manual means for releasing said locking means whereby to allow said spring means to partially rotate said shaft in the opposite direction and return said wheels to their inoperative position, a supporting means for supporting said hydraulic means and said spring means, said supporting means also having guide means for supporting and guiding said locking means whereby to lock said supporting means to said shaft and to cause said locking means to rotate with said shaft, and snubber means mounting said supporting means for clamping oscillatory movements of said shaft and the wheels mounted thereon when said supporting means is locked to said shaft.

3. A boat having a shaft extending transversely across the same, cranks adjacent the ends of said shaft and wheels on said cranks, hydraulic means for rotating said shaft in one direction comprising a hydraulic cylinder, a piston in said cylinder, eccentric means fixed to said shaft and means connecting said eccentric means to said piston, spring means for moving said shaft, whereby movement of said piston by hydraulic actuation causes partial rotation of said eccentric means and said shaft, said spring means having means connecting the same with said shaft whereby said piston and shaft movement causes the storing of power in said spring means, locking means for locking said shaft and the wheels supported thereon in operative position, and manual means for releasing said locking means whereby to allow said spring means to partially rotate said shaft in the opposite direction and return said wheels to their inoperative position, and a supporting means for mounting said hydraulic means and said spring means.

4. The structure of claim 3 wherein said means for connecting said spring means to said shaft comprises a quadrant having a curved track portion, said quadrant being fixed to said shaft.

5. The structure of claim 1 wherein said snubber means includes a framework having one of its ends mounted on said shaft, and a rubber block supporting the opposite end of said framework.

6. The structure of claim 5 wherein said framework is provided with means for supporting said hydraulic cylinder.

References Cited in the file of this patent

UNITED STATES PATENTS

| | | |
|---|---|---|
| 2,050,481 | Blazek et al. | Aug. 11, 1936 |
| 2,376,576 | Cross | May 22, 1945 |
| 2,501,750 | Warner | Mar. 28, 1950 |
| 2,570,528 | Davis | Oct. 9, 1951 |
| 2,662,236 | Kester | Dec. 15, 1953 |
| 2,692,097 | Payne | Oct. 19, 1954 |

FOREIGN PATENTS

| | | |
|---|---|---|
| 649,243 | Great Britain | Dec. 12, 1949 |